United States Patent
Tiew et al.

(10) Patent No.: US 7,352,161 B2
(45) Date of Patent: Apr. 1, 2008

(54) BURST-MODE SWITCHING VOLTAGE REGULATOR WITH ESR COMPENSATION

(75) Inventors: Kee-Cheo Tiew, Richardson, TX (US); Jingwel Xu, Shanghai (CN); Brett Smith, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 280 days.

(21) Appl. No.: 11/012,408

(22) Filed: Dec. 15, 2004

(65) Prior Publication Data
US 2006/0125455 A1 Jun. 15, 2006

(51) Int. Cl.
G05F 1/56 (2006.01)
(52) U.S. Cl. .................. 323/285; 323/222; 323/283
(58) Field of Classification Search ............... 323/222, 323/282, 283, 285
See application file for complete search history.

(56) References Cited

U.S. PATENT DOCUMENTS

| | | | | |
|---|---|---|---|---|
| 4,837,495 A | * | 6/1989 | Zansky | 323/222 |
| 5,612,610 A | * | 3/1997 | Borghi et al. | 323/222 |
| 5,949,229 A | * | 9/1999 | Choi et al. | 323/320 |
| 6,100,677 A | * | 8/2000 | Farrenkopf | 323/285 |
| 6,181,120 B1 | * | 1/2001 | Hawkes et al. | 323/282 |
| 6,194,884 B1 | * | 2/2001 | Kesler et al. | 323/285 |
| 6,366,070 B1 | * | 4/2002 | Cooke et al. | 323/284 |
| 6,388,429 B1 | * | 5/2002 | Mao | 323/222 |
| 6,724,174 B1 | * | 4/2004 | Esteves et al. | 323/224 |
| RE38,780 E | * | 8/2005 | Hawkes et al. | 323/282 |
| 6,946,819 B2 | * | 9/2005 | Fagnani et al. | 323/207 |
| RE38,906 E | * | 12/2005 | Hawkes et al. | 323/282 |
| 6,984,963 B2 | * | 1/2006 | Pidutti et al. | 323/207 |
| 7,116,090 B1 | * | 10/2006 | Yang et al. | 323/288 |
| 7,126,318 B2 | * | 10/2006 | Oswald et al. | 323/288 |

* cited by examiner

Primary Examiner—Jeffrey Sterrett
(74) Attorney, Agent, or Firm—William B. Kempler; W. James Brady, III; Frederick J. Telecky, Jr.

(57) ABSTRACT

System and method for a burst-mode switching voltage regulator with good stability and small output voltage ripple. A preferred embodiment comprises a current sense circuit coupled to a power switch in the burst-mode switching voltage regulator to sense a current flowing through the power switch. The sensed current can then be used (in conjunction with a feedback control signal that is based on the output voltage and is generated at the output of the burst-mode switching generator) to control the operation of the power switch to regulate the output voltage of the burst-mode switching voltage regulator. This enables the use of an output regulator with a small equivalent series resistance to minimize voltage ripple while providing good operational stability and fast transient response.

20 Claims, 5 Drawing Sheets

BURST-MODE SWITCHING VOLTAGE REGULATOR WITH ESR COMPENSATION

TECHNICAL FIELD

The present invention relates generally to a system and method for mixed signal circuitry, and more particularly to a system and a method for a burst-mode switching voltage regulator with good stability, fast transient response, and small output voltage ripple.

BACKGROUND

Essentially all of today's electronic systems require some form of power conversion, be it changing alternating current voltage levels, converting alternating current to direct current, changing direct current voltage levels, or combinations thereof. In situations where changing voltage levels of direct current are needed, a switching voltage regulator is a preferred solution. A switching voltage regulator can be used to step-up voltage levels (boost) or step-down voltage levels (buck) or a combination of both.

A switching voltage regulator makes use of an inductor, a transformer, or a capacitor as an energy-storage element to transfer energy from an input to an output in discreet packets. Feedback circuitry can be used to regulate the energy transfer to maintain a constant voltage level within the load limits of the circuit. A burst-mode switching voltage regulator is popular for its fast transient response since there is no requirement for an error amplifier or a compensator in the feedback path. Typically, a burst-mode switching voltage regulator will have a low equivalent series resistance (ESR) capacitor at its output to help reduce output ripples.

One disadvantage of the prior art is that if the ESR capacitor has too small of a resistance, then the burst-mode switching voltage regulator may not be stable.

A second disadvantage of the prior art is that if the ESR capacitor has too large of a resistance, then the burst-mode switching voltage regulator may have significant ripples in its output.

SUMMARY OF THE INVENTION

These and other problems are generally solved or circumvented, and technical advantages are generally achieved, by preferred embodiments of the present invention which provides a system for a buck burst-mode switching voltage regulator with good stability, fast transient response, and small output voltage ripple.

In accordance with a preferred embodiment of the present invention, a voltage regulator circuit is provided. The voltage regulator circuit has a signal output, wherein the signal output is coupled to an output capacitor. The voltage regulator circuit comprises a power switch coupled to an input power source, the power switch to selectively complete a current path from the input power source through an energy storage device to provide an output voltage at a specified voltage level, a current sense circuit coupled to the power switch, the current sense circuit being configured to detect a current flowing through the power switch, and a feedback compensator circuit coupled to the current sense circuit and to a feedback control signal line, the feedback compensator circuit being configured to generate a signal based upon the detected current and a feedback control signal that is to be used to control the state of the power switch.

In accordance with another preferred embodiment of the present invention, a burst-mode switching voltage regulator is provided. The burst-mode switching voltage regulator comprises a voltage regulator circuit having an output coupled to an output capacitor, wherein the output capacitor has a low equivalent series resistance, the voltage regulator circuit being configured to provide an output voltage, and a resistor-divider network coupled in parallel to the output capacitor, the resistor-divider network to provide a feedback control signal. The voltage regulator circuit comprises a power switch computed to an input power source, the power switch to selectively complete a current path from the input power source through an energy storage device to provide an output voltage level, a current sense circuit coupled to the power switch, the current sense circuit being configured to detect a current flowing through the power switch, and a feedback compensator circuit coupled to the current sense circuit and to a feedback control signal line, the feedback compensator circuit being configured to generate a signal based upon a detected current and a feedback control signal that is used to control the state of the power switch.

In accordance with another preferred embodiment of the present invention, a method for regulating a voltage in a burst-mode switching voltage regulator is provided. The method comprises sensing a current feedback signal based upon an output current, sensing a voltage feedback signal based upon an output voltage, deriving a control signal based upon the current feedback signal and the voltage feedback signal, and using the control signal to control the state of a switch regulating current flow in the burst-mode switching voltage regulator.

An advantage of a preferred embodiment of the present invention is an output capacitor with low ESR that can be used to provide an output voltage with small ripple.

A further advantage of a preferred embodiment of the present invention is that by internally sensing the output current and providing needed compensation, stability can be maintained without requiring the use of an output capacitor with large resistance.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a burst-mode switching voltage regulator (either buck or boost) where small output ripple is desired with good stability and fast transient response. The invention may also be applied, however, to other burst-mode switching voltage regulators wherein small output ripple, fast transient response, and good stability are desired, such as combination buck-boost voltage regulators.

Figure 1A:
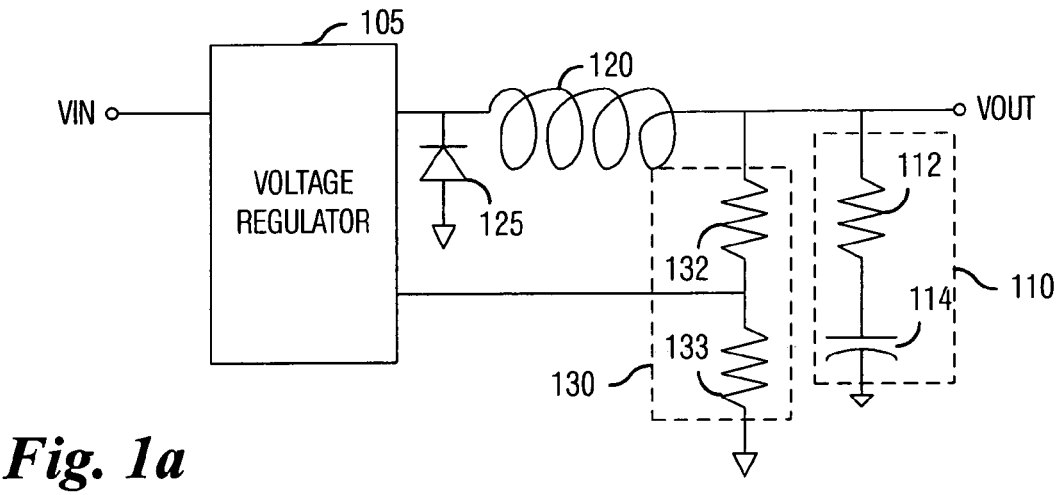
FIGS. 1a and 1b are diagrams of a buck burst-mode switching voltage regulator.

With reference now to FIG. 1a, there is shown a diagram illustrating a buck burst-mode switching voltage regulator 100. The buck burst-mode switching voltage regulator 100, by definition, takes an input voltage (VIN) and converts it to an output voltage (VOUT), wherein the output voltage is at a lower voltage potential than the input voltage. The buck burst-mode switching voltage regulator 100 comprises a voltage regulator circuit 105 and an output capacitor 110 to help smooth out any ripples in the output voltage. Note that the voltage regulator circuit 105 is typically integrated into an integrated circuit. This can be done to help reduce overall costs, ease manufacture, decrease size, increase reliability, and so forth. The output capacitor 110 can be modeled as a resistance (shown as resistor 112) and a capacitance (shown as capacitor 114).

Also at the output of the voltage regulator circuit 105 is an inductor 120 that can be used to convert rapid changes in voltage levels into a current, while a diode 125 provides a return current path. A pair of resistors 132 and 133, coupled in series between the output of the voltage regulator circuit 105 and electrical ground can function as a resistor-divider network 130 to provide a fraction of the output voltage of the voltage regulator circuit 105 back to the voltage regulator circuit 105. The resistors 132 and 133 should be sufficiently large to reduce quiescent current but small enough to provide an adequate measure of noise immunity. The signal provided by the resistor-divider network 130 is used as a feedback control signal to regulate the output of the voltage regulator circuit 105. Note that since it can be difficult to integrate an inductor (the inductor 120) into an integrated circuit, it may be necessary to leave the inductor 120 outside of an integrated buck burst-mode switching regulator. Additionally, the output capacitor 110 is also left outside of an integrated regulator to enable the ability to change the output capacitor 110 to meet changing needs.

Figure 1B:
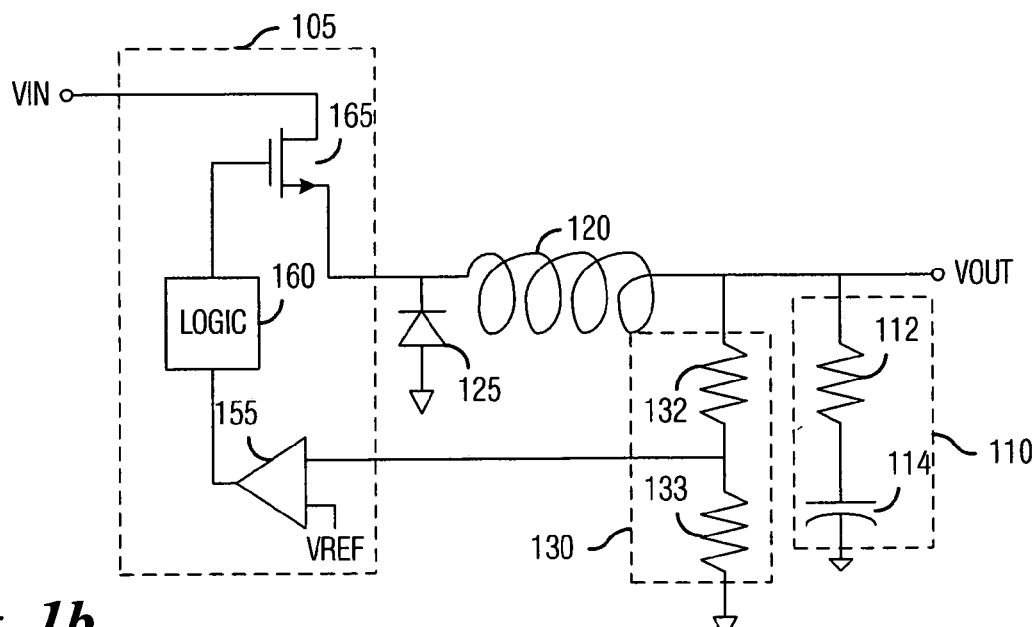

With reference now to FIG. 1b, there is shown a diagram illustrating a detailed view of the buck burst-mode switching voltage regulator 100. The diagram shown in FIG. 1b provides a detailed view of the voltage regulator circuit 105, which may be integrated into an integrated circuit. The voltage regulator circuit 105 can include a comparator 155 which can be used to compare a feedback control signal (provided by the resistor-divider network 130 with a reference voltage signal (VREF). The comparator 155 may be a simple magnitude comparator, used to determine if the feedback control signal is greater than or less than the VREF. An output from the comparator can be provided to a logic block 160.

The logic block 160 can contain combinatorial logic or firmware and software needed to generate a control signal based upon the value of the output from the comparator 155. The logic block 160 can produce a control signal that is provided to a switch 165 (shown implemented as a transistor) to control the coupling of the input voltage to the output of the voltage regulator circuit 105. In addition to controlling the state of the switch 165, the logic block 160 can also be used to filter and deglitch the feedback control signal.

The selection of the output capacitor 110 is of vital importance to the operation of the voltage regulator 100. An output capacitor with too small an ESR (equivalent series resistance) can result in unstable voltage regulator operation, while an output capacitor with too large of an ESR can result in an output voltage with significant ripple. The stability of the voltage regulator can be addressed since the feedback control signal (provided by the resistor-divider network 130) is directly dependent upon a current sensed using the ESR of the output capacitor 110. However, if the feedback control signal can be dependent upon a current that is not sensed using the ESR of the output capacitor 110, it can be possible to have an output capacitor with a low ESR and still provide stable operation.

Figure 2:
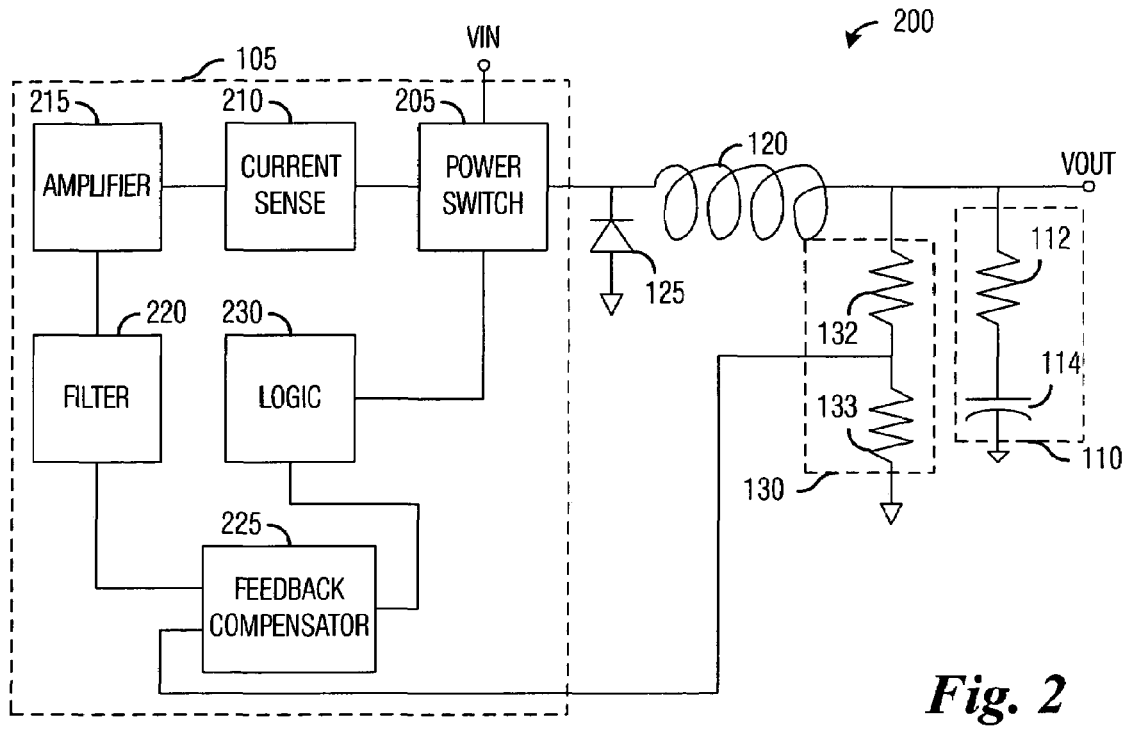
FIG. 2 is a high-level diagram of a buck burst-mode switching voltage regulator with an output capacitor with a small equivalent series resistance, according to a preferred embodiment of the present invention.

With reference now to FIG. 2, there is shown a diagram illustrating a block level view of a buck burst-mode switching voltage regulator 200, wherein an output capacitor with a low ESR can still yield operation with good stability, according to a preferred embodiment of the present invention. According to a preferred embodiment of the present invention, the buck burst-mode switching voltage regulator 200 can include a voltage regulator circuit 105, the output capacitor 110 (modeled as the resistor 112 and capacitor 114), the inductor 120, the diode 125, and the resistor-divider network 130. The arrangement of these components can be substantially similar to that of the buck burst-mode switching voltage regulator 100 (FIGS. 1a and 1b). However, rather than summing the output current and the output voltage at the resistor 112 and using a fraction of the result as a feedback control signal to control the state of the switch 165, which could make the buck burst-mode switching voltage regulator 100 sensitive to the size of the resistor 112, the summing of the output current and the output voltage occurs internally (in the voltage regulator circuit 105) and therefore is not dependant on the size of the resistor 112.

The voltage regulator circuit 105 includes a power switch 205, which can be used to regulate current flow from power source (VIN). The power switch 205 can be used to control the duty cycle of the current provided from the power source, VIN, and therefore, setting the magnitude of the output voltage (VOUT). Since the voltage regulator circuit 105 is designed to internally sum the output current of the buck burst-mode switching voltage regulator 200, a current sense circuit 210, coupled to the power switch 205, is used to detect the magnitude of the current being provided by the power source, VIN. Note that it can be desirable to have minimum impact on the current being provided by the power source, VIN, while measuring the current. One possible way to do this is to measured a scaled version of the current, rather than actually measuring the current. To measure the full magnitude of the current, it may be necessary to perturb the current by inserting circuitry into the current path, potentially leading to a less efficient voltage regulator (due to the additional circuits in the current path).

Since the current sense circuit 210 measures a scaled version of the current being provided by the power source, VIN, an amplifier 215 can be used to sufficiently amplify an output signal produced by the current sense circuit 210 so that the output signal is at a power level that is compatible with other circuitry in the voltage regulator circuit 105. After amplification, the output signal of the current sense circuit 210 can be filtered by a filter 220, which can be used to help eliminate any direct current (DC) components of the amplified output signal. Since the amplified output signal, which is representative of the output current of the buck burst-mode switching voltage regulator 200, is to be combined with the output voltage of the buck burst-mode switching voltage regulator 200, it can be desired that any DC offset present in the amplified output signal be eliminated prior to the combination.

The amplified output signal, with any DC offset removed, can then be provided to a feedback compensator circuit 225, which can be used to combine the amplified output signal with a feedback control signal provided by the resistor-divider network 130. After combining the two signals, the feedback compensator circuit 225 can use the combined signal to produce a control signal that can be provided to a logic circuit 230. The control signal can be used by the logic circuit 230 to generate a control signal that can be used to regulate the operation of the power switch 205. For example, the control signal generated by the logic circuit 230 can be used to turn on or turn off the power switch 205. The logic circuit 230 can generate the control signal to help eliminate glitches that may be present on the output of the buck burst-mode switching voltage regulator 200 (either in the current or voltage).

Figure 3:
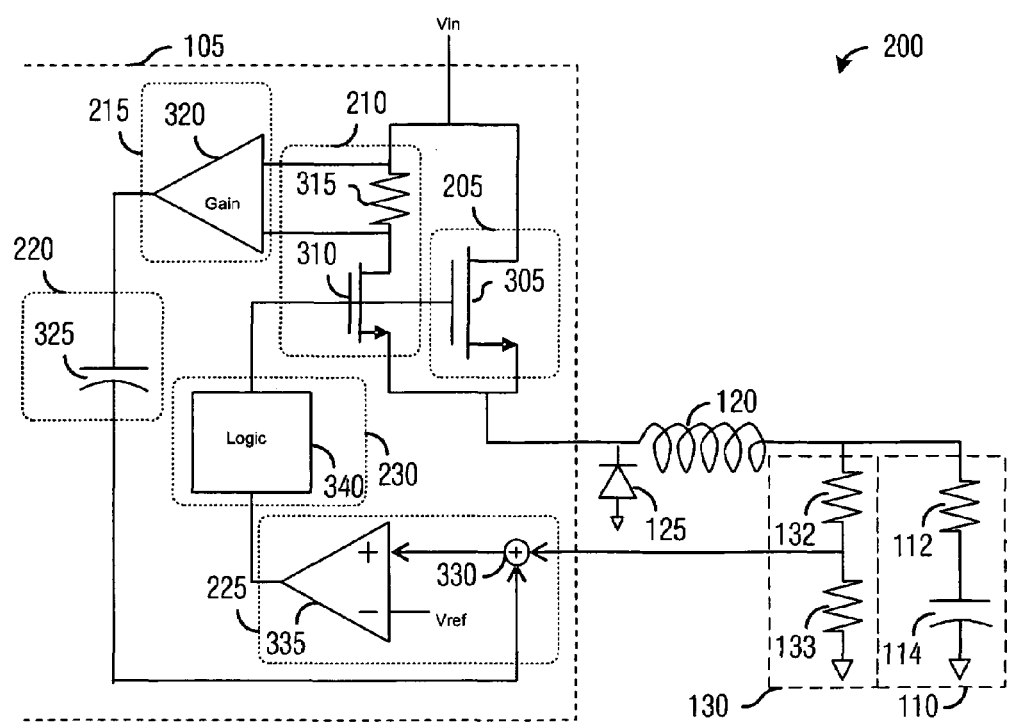
FIG. 3 is a detailed diagram of a buck burst-mode switching voltage regulator with an output capacitor with a small equivalent series resistance, according to a preferred embodiment of the present invention.

With reference now to FIG. 3, there is shown a diagram illustrating a detailed view of a buck burst-mode switching voltage regulator 200, wherein an output capacitor with a low ESR can still yield operation with good stability, according to a preferred embodiment of the present invention. The voltage regulator circuit 105 includes a main transistor 305 (implementing the power switch 205). According to a preferred embodiment of the present invention, the main transistor 305 may be implemented using a power field-effect transistor (FET), however, other transistors, such as a bipolar junction transistor (BJT) can be used to implement the power switch 205. Since the power switch 205 may need to pass a significant amount of current, a large FET (or BJT) may be needed.

The current sense circuit 210 can be implemented using a ratio transistor 310 (again, preferably implemented using a FET, but other transistor types, such as a BJT can be used) and a resistor 315. Since minimum impact on the current being provided by the power source, VIN, is desired, the ratio transistor 310 is specified to be smaller than the main transistor 305. Similarly, the resistor 315 is specified to be small, to minimize the offset between the ratio transistor 310 and the main transistor 305. In order to accurately mirror the current flowing through the main transistor 305, the current sense circuit 210 is arranged in parallel with the main transistor 305 and a control signal (generated by the logic circuit 230) that is used to control the main transistor 305 is also used to control the ratio transistor 310. Therefore, when the main transistor 305 is turned on, the ratio transistor 310 is also turned on, and vice versa. Note that a ratio between the ratio transistor 310 and the main transistor 305 should a large number (on the order of several hundred) so that the ratio offset due to resistor 315 is reduced. However, making the ratio too large will start introduce mismatch error between the two transistors 310 and 305.

The amplifier 215 can be implemented using either a variable or fixed gain amplifier 320. The amplifier 215 can measure the voltage drop across the resistor 315 (due to a current flowing across the resistor 315) and amplify the current to a level that is compatible with subsequent processing. The filter 220, which can be used to eliminate any DC offset present in the amplified output signal, can be implemented as a high-pass filter (HPF). According to a preferred embodiment of the present invention, a capacitor 325 can be used to eliminate the DC offset (zero frequency components) while permitting higher frequency components to pass.

A summing point 330 and a comparator 335 may be used to implement the feedback compensator circuit 225. The summing point 330 can be used to combine the filtered, amplified output signal produced by the current sense circuit 210 with the feedback control signal from the resistor-divider circuit 130. Output of the summing point 330 (the combination of the filtered, amplified output signal produced by the current sense circuit 210 and the feedback control signal from the resistor-divider circuit 130) can then be provided to one of two inputs of the comparator 335. The second input of the comparator 335 can be provided with a reference voltage, VREF.

The comparator 335 can then compare the two inputs and produce an output signal that denotes if the output of the summing point 330 is greater than, less than, or equal to the reference voltage, VREF. The output signal produced by the comparator 335 can then be provided to a logic block 340 (an implementation of the logic circuit 230) wherein it is used to generate a control signal for the main transistor 305 and the ratio transistor 310. The logic block 340 can generate a control signal to turn off the main transistor 305 and the ratio transistor 310 if the output of the summing point 330 is greater than the reference voltage, VREF, for example. Alternatively, the logic block 340 can generate a control signal to turn on the main transistor 305 and the ratio transistor if the output of the summing point 330 is less than the reference voltage, VREF.

Certain circuit elements can be difficult to integrate into an integrated circuit. For example, the inductor 120 may be difficult to fabricate due to potentially large inductance values as well as potentially large current handling requirements. The output capacitor 110 may also be difficult to integrate. However, it is typically desirable to integrate as much of the buck burst-mode switching voltage regulator 200 as possible.

Figure 4:
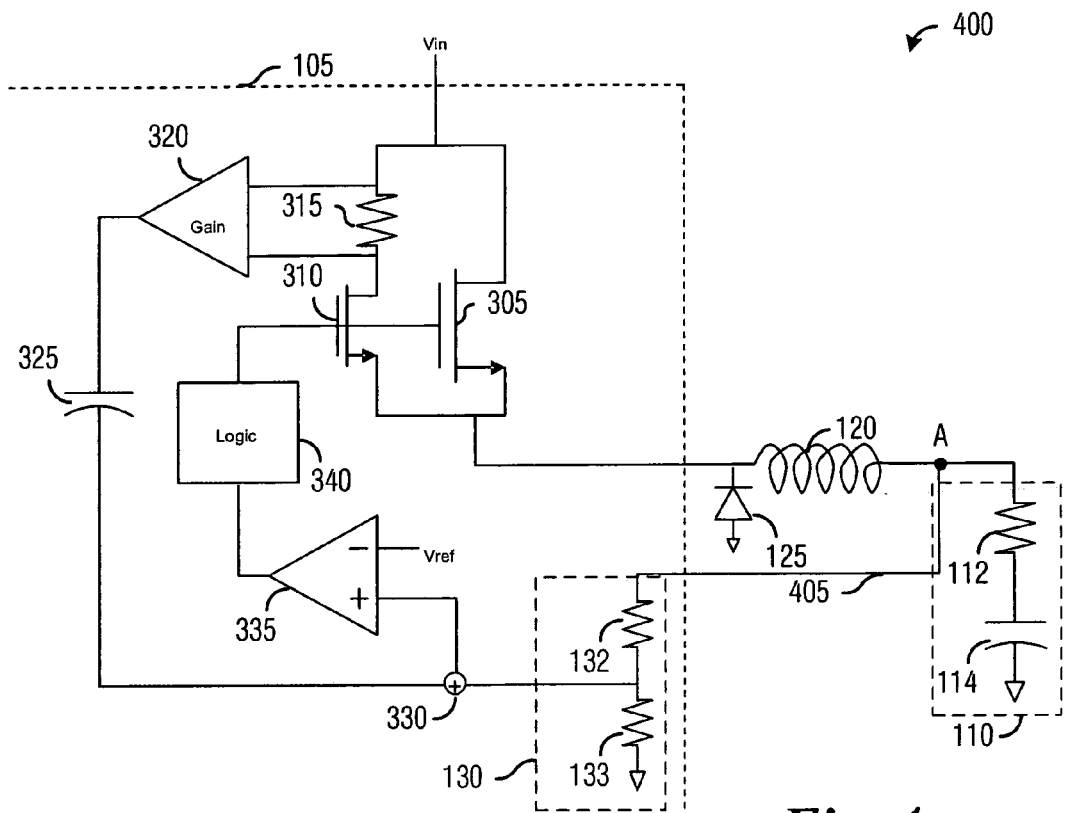
FIG. 4 is a diagram of a buck burst-mode switching voltage regulator with an integrated resistor-divider network, according to a preferred embodiment of the present invention.

With reference now to FIG. 4, there is shown a diagram illustrating a buck burst-mode switching voltage regulator 400, wherein the voltage regulator features a high degree of integration, according to a preferred embodiment of the present invention. As discussed earlier, it may not be possible to integrate the inductor 120 into the voltage regulator circuit 105 (the integrated circuit portion of the buck burst-mode switching regulator 400), due to difficulties in fabricating an inductor of adequate size and current handling capabilities. However, it may be possible to integrate other circuit elements in the buck burst-mode switching voltage regulator 400. For example, it can be possible to integrate the resistor-divider network 130 into the voltage regulator circuit 105 without incurring additional costs such as increased packaging pin count and so forth.

The diagram shown in FIG. 4 illustrates the buck burst-mode switching regulator 400, wherein the resistor-divider network 130 has been integrated into the voltage regulator circuit 105. As shown in FIG. 4, the output capacitor 110 remains coupled to one terminal of the inductor 120. However, rather than having the resistor-divider network 130 been configured in parallel with the output capacitor 110 and residing outside of the voltage regulator circuit 105, a conductive trace 405 brings the electrical node A into the voltage regulator circuit 105, where the resistor-divider network 130 has been integrated. Since a conductive trace typically would bring a signal from an external resistor-divider network (referencing FIGS. 1*a*, 1*b*, 2, and 3) into the voltage regulator circuit 105, no additional packaging pin is needed.

As discussed previously, the present invention is also applicable to boost burst-mode switching voltage regulators as well as to buck burst-mode switching voltage regulators. In a boost burst-mode switching voltage regulator, the output DC voltage has a higher magnitude than the input DC voltage.

Figure 5:
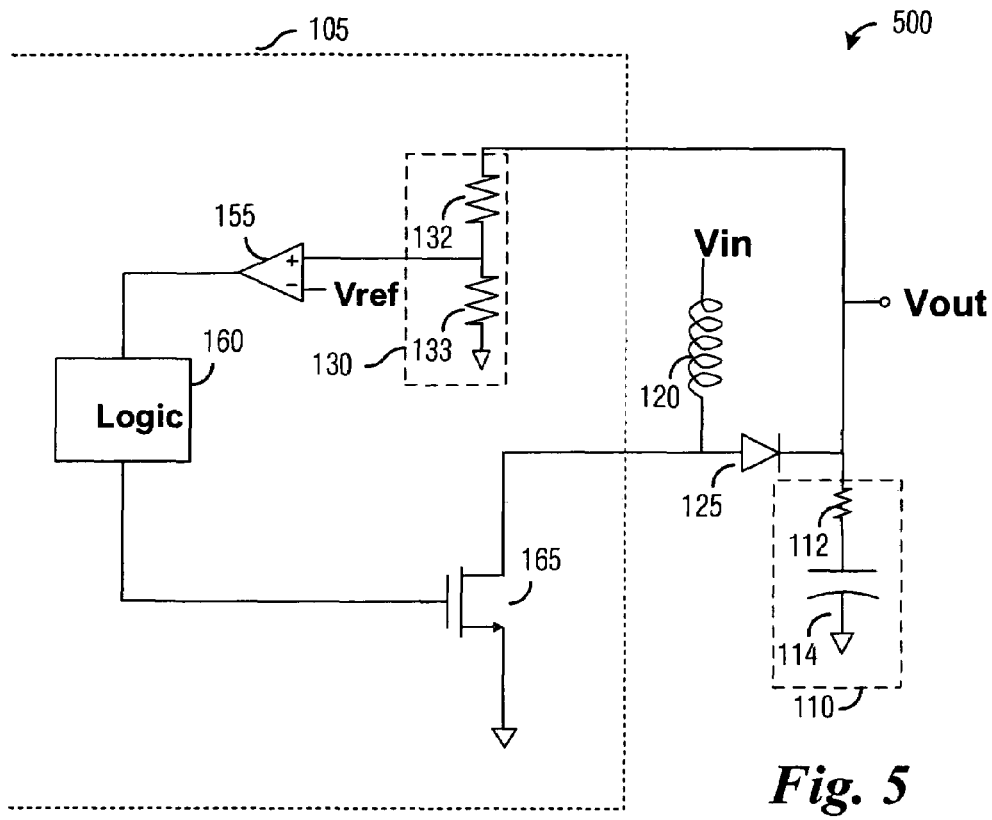
FIG. 5 is a diagram of a boost burst-mode switching voltage regulator.

With reference now to FIG. 5, there is shown a diagram illustrating a boost burst-mode switching voltage regulator 500. The boost burst-mode switching voltage regulator 500 takes an input voltage (VIN) and converts it to an output voltage (VOUT), wherein the output voltage is at a higher voltage potential than the input voltage. The boost burst-mode switching voltage regulator 500 comprises a voltage regulator circuit 105 and an output capacitor 110 at an output voltage terminal to help smooth out any ripples in the output voltage. As discussed previously, the voltage regulator circuit 105 is typically integrated into an integrated circuit. The output capacitor 110 can be modeled as a resistance (resistor 112) and a capacitance (capacitor 114).

An inductor 120 coupled between an input voltage terminal and the output capacitor 110 can be used to convert rapid changes in voltage levels into a current, while a diode 125 can be present to prevent a feedback current from occurring between the output voltage terminal and electrical ground. A resistor-divider network 130, comprising resistors 132 and 133, provides a voltage feedback signal from the output voltage terminal to a comparator 155, wherein the voltage feedback signal is compared to a voltage reference. A logic block 160 can make use of an output produced by the comparator 155 to control the state of a switch 165 (shown in FIG. 5 as a transistor). Note that like the buck burst-mode switching voltage regulator shown in FIG. 1*b*, the control of the state of the switch 165 is based solely upon the voltage feedback signal. This can lead to unstable operation (or significant output voltage ripple) depending upon the ESR of the output capacitor 110.

Figure 6:
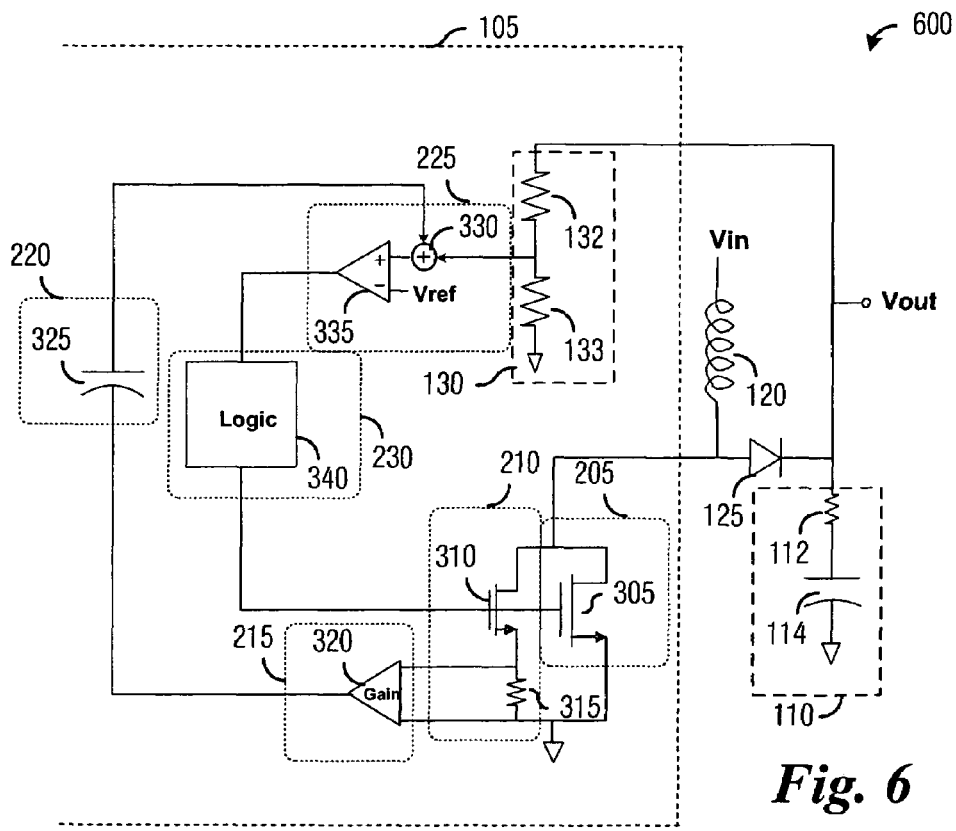
FIG. 6 is a diagram of a boost burst-mode switching voltage regulator with an output capacitor with a small equivalent series resistance, according to a preferred embodiment of the present invention.

With reference now to FIG. 6, there is shown a diagram of a boost burst-mode switching voltage regulator 600, wherein an output capacitor with a low ESR can still yield operation with good stability, according to a preferred embodiment of the present invention. In the discussion of the buck burst-mode switching voltage regulator 200 (FIG. 2), the use of both a voltage feedback signal and a current feedback signal to generate a control signal for controlling the state of a switch responsible for regulating current flow can enable the use of an output capacitor with a low ESR while maintaining good stability and low output voltage ripple. The same technique can be used with a boost burst-mode switching voltage regulator.

The boost burst-mode switching voltage regulator 600 makes use of both a voltage feedback signal and a current feedback signal to generate a control signal to control the state of a switch regulating current flow. Without the use of the current feedback signal, the inductor 120 can be charged blindly every time a switch controlling the current flow in the boost burst-mode switching voltage regulator 600 turns on. In addition to the resistor-divider network 130 that can be used to provide the voltage feedback signal (similar to the boost burst-mode switching voltage regulator 500 (FIG. 5)), a current sense circuit 210 is configured to measure a scaled version of the current being provided by the power source, VIN. The current sense circuit 210 comprises a ratio switch 310 (shown implemented as a transistor 310) and a resistor 315, wherein the resistor 315 provides a needed voltage drop that can be detected. Note that since the current flowing through the current sense circuit 210 is a scaled version of the current flowing through a power switch 205 (shown implemented as a transistor 305), the transistor 310 can be smaller than a transistor implementing the power switch 205.

An amplifier 215 (shown implemented as a variable or fixed gain amplifier 320) can be used to sufficiently amplify an output signal produced by the current sense circuit 210 so that the output signal is at a power level that is compatible with other circuitry in the voltage regulator circuit 105. After amplification, the output signal of the current sense circuit 210 can be filtered by a filter 220, which can be used to help eliminate any direct current (DC) components of the amplified output signal. Since the amplified output signal, which is representative of the output current of the boost burst-mode switching voltage regulator 600, is to be combined with a signal that is representative of the output voltage of the boost burst-mode switching voltage regulator 600, it can be desired that any DC offset present in the amplified output signal be eliminated prior to the combination.

An output of the filter 220, representative of the current feedback signal, can then be combined with an output of the resistor-divider network 130, representative of the voltage feedback signal, in a feedback compensator circuit 225. The combination of the two feedback signals can be performed by a summing point 330. An output of the summing point 330 can then be provided to a comparator 335, which compares the output with a voltage reference, VREF. An output of the feedback compensator circuit 225 can then be provided to a logic circuit 230 (implemented as a logic block 340), which makes use of the output to generate a control signal to control the states of the power switch 205 and the ratio switch 310.

Figure 7:
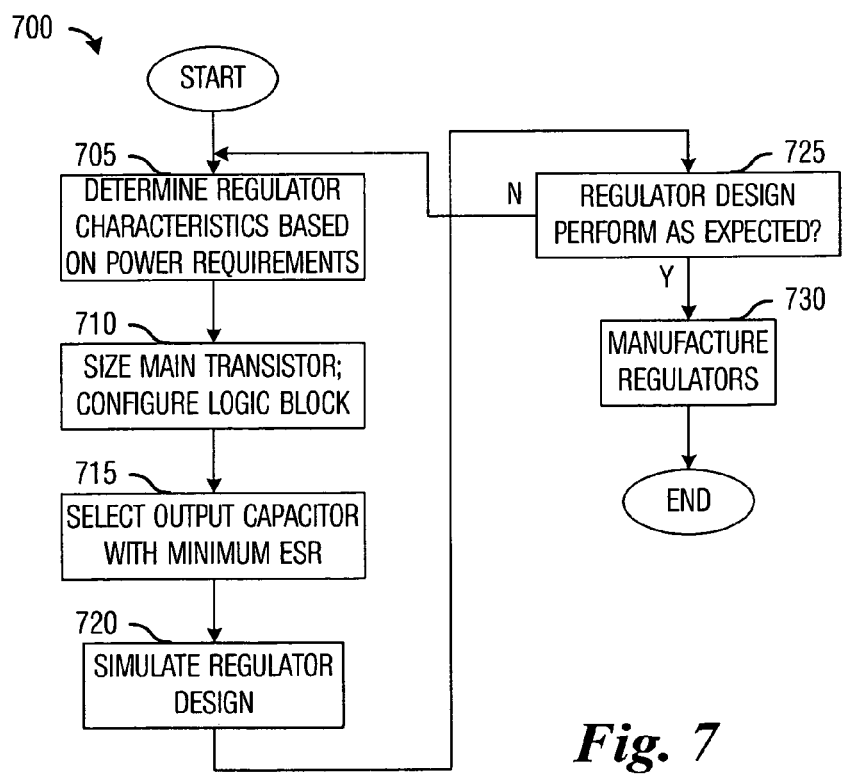
FIG. 7 is a diagram of a sequence of events in the designing of a buck burst-mode switching voltage regulator, according to a preferred embodiment of the present invention.

With reference now to FIG. 7, there is shown a flow diagram illustrating a sequence of events 700 in designing a burst-mode switching voltage regulator to meet a specific set of power requirements, according to a preferred embodiment of the present invention. According to a preferred embodiment of the present invention, the sequence of events 700 can be descriptive in the designing of a burst-mode switching voltage regulator with the ability to make use of an output capacitor with a low ESR and yet provide good stability to meet a specific set of power requirements. Note that the sequence of events 700 can be used to design either a boost or buck burst-mode switching voltage regulator.

The designing of the burst-mode switching voltage regulator can begin by determining a set of characteristics for the voltage regulator based upon a set of performance requirements (block 705). The performance requirements can be the magnitude of the desired output voltage, magnitude of the desired output current, degree of acceptable ripple, the power dissipation of the voltage regulator, and so forth. From the requirements, it can be possible to determine a set of characteristics for the voltage regulator. The set of characteristics can include the current handling capabilities of the main transistor 305 (and perhaps that of the ratio transistor 310), the magnitude of the reference voltage (VREF), the configuration of the logic block 340, and so forth (block 710). Additionally, the performance requirements can also specify the output capacitor 110, especially, the ESR of the output capacitor 110 (block 715).

With the characteristics of the burst-mode switching voltage regulator specified, it can be possible to simulate the operation of the voltage regulator to determine if the design meets the performance requirements (block 720). If the voltage regulator performs as expected (block 725), then the design of the voltage regulator can be approved and the voltage regulators can be manufactured (block 730). If the voltage regulator does not perform as expected (block 725), then the design of the voltage regulator may need to be changed. This can require a modification of the characteristics, therefore, the designing of the buck burst-mode switching voltage regulator can return to block 705 to redesign the voltage regulator.

Figure 8:
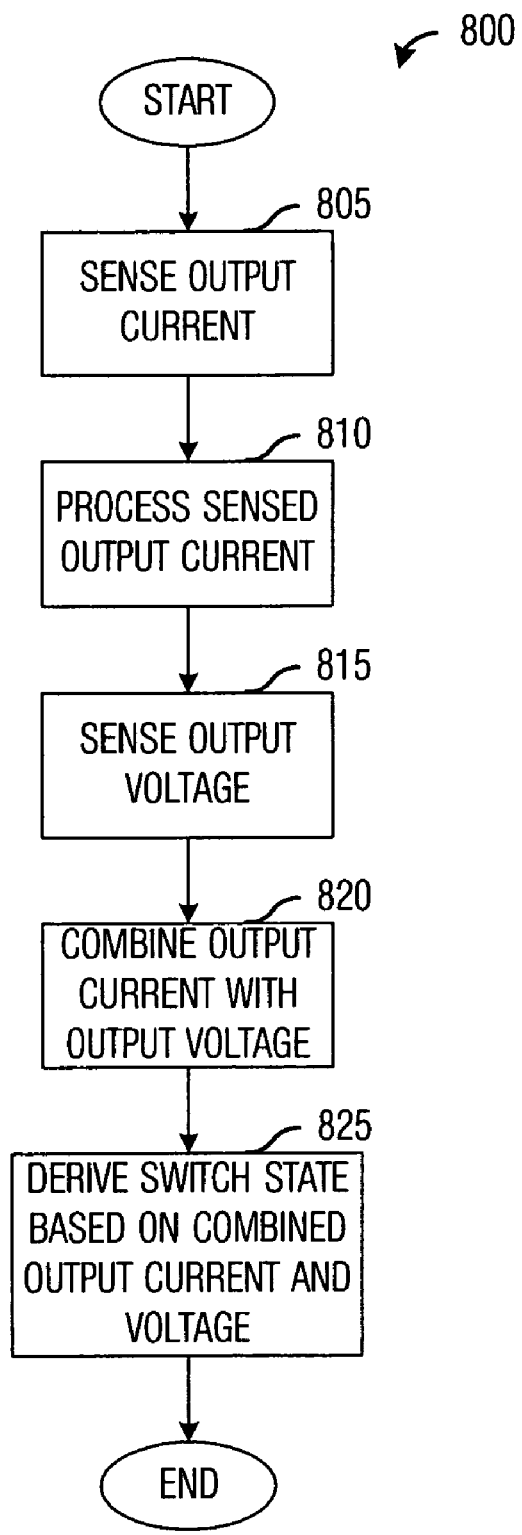
FIG. 8 is a diagram of the operation of a burst-mode switching voltage regulator, according to a preferred embodiment of the present invention.

With reference now to FIG. 8, there is shown a flow diagram illustrating an algorithm 800 for operating a burst-mode switching voltage regulator with good stability, fast transient response, and small output voltage ripple, according to a preferred embodiment of the present invention. The algorithm 800 can be descriptive of the operation of a burst-mode switching voltage regulator, such as the buck burst-mode switching voltage regulator 200 (FIG. 2) or the boost burst-mode switching voltage regulator 600 (FIG. 6).

The operation of the burst-mode switching voltage regulator can begin with a sensing of the output current (block 805). As discussed previously, the sensing of the output current can be performed via a current sense circuit 210, which can be designed to sense a scaled version of the current flowing through the burst-mode switching voltage regulator. After sensing the output current, the signal produced by the current sense circuit 210 can undergo processing (block 810), such as amplification and filtering. The amplification can be used to bring the signal produced by the current sense circuit 210 to an appropriate level while the filtration can be used to help eliminate any DC offset that can be present in the signal. While the output current is being sensed and processed (blocks 805 and 810), the output voltage can be sensed (block 815). According to a preferred embodiment of the present invention, the output voltage can be sensed using a resistor-divider network 130.

The output current signal and the output voltage signal can then be combined (block 820) and then used to derive a signal that can be used to control the state of a switch responsible for regulating the current flow in the burst-mode switching voltage regulator (block 825). The use of both the output current and the output voltage to generate a control signal for the switch regulating the current flow results in the regulation of both the output current and the output voltage of the burst-mode switching voltage regulator. If only one (either the output current or the output voltage) is used to regulate the current, then while the signal is under regulation (either the output current or the output voltage), the other signal (either the output voltage or the output current) is not regulated and can fluctuate widely. Note that while the algorithm 800 is described as operating in a sequential fashion, the sensing of the output current and the output voltage can be occurring in parallel, as well as the derivation of the switch control signal.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A voltage regulator circuit having a signal output, the signal output coupled to an output capacitor, the voltage regulator circuit comprising:
    a power switch coupled to an input power source, the power switch to selectively complete a current path from the input power source through an energy storage device to provide an output current at a specified voltage level;
    a current sense circuit coupled to the power switch, the current sense circuit being configured to detect a current flowing through the power switch and generate a current signal consisting essentially of an AC component thereof; and
    a feedback compensator circuit coupled to the current sense circuit and to a feedback control signal line, the feedback compensator circuit being configured to generate a signal based upon the current signal and a voltage feedback control signal that is a direct measurement of the output voltage and is to be used to control the state of the power switch.

2. The voltage regulator circuit of claim 1, wherein the voltage feedback control signal is provided by a resistor-divider network coupled in parallel to the output capacitor.

3. The voltage regulator circuit of claim 1 further comprising:
    an amplifier coupled between the current sense circuit and the feedback compensator circuit, the amplifier to increase the magnitude of the detected current; and
    a filter coupled between the amplifier and the feedback compensator circuit, the filter to eliminate any direct current (DC) offset present in the amplified detected current.

4. The voltage regulator circuit of claim 1 further comprising a logic circuit coupled between the feedback compensator circuit and the power switch, the logic circuit being configured to generate a control signal to control the state of the power switch based upon an output produced by the feedback compensator circuit.

5. The voltage regulator circuit of claim 1, wherein the current sense circuit comprises a ratio switch coupled in series with a resistor that is coupled to the input power source, wherein the ratio switch and the resistor is coupled in parallel with the power switch, and wherein both the power switch and the ratio switch are controlled by the same control signal.

6. The voltage regulator circuit of claim 5, wherein the ratio switch and the power switch are implemented as transistors, and wherein the transistor used for the power switch is substantially larger than the transistor used for the ratio switch.

7. The voltage regulator circuit of claim 1, wherein the feedback compensator circuit comprises:
- a summing point coupled to the current sense circuit and receiving the current signal and the voltage feedback control signal, the summing point to combine by the current signal and the voltage feedback control signal; and
- a comparator having a first input coupled to an output of the summing point and a second input coupled to a reference voltage supply, the comparator to produce an output signal based upon a comparison of the output of the summing point and a signal produced by the reference voltage supply.

8. A burst-mode switching voltage regulator comprising:
a voltage regulator circuit having an output coupled to an output capacitor, wherein the output capacitor has a low equivalent series resistance, the voltage regulator circuit being configured to provide an output voltage, the voltage regulator circuit comprising:
- a power switch coupled to an input power source, the power switch to selectively complete a current path from the input power source through an energy storage device to provide an output current at a specified voltage level;
- a current sense circuit coupled to the power switch, the current sense circuit being configured to detect a current flowing through the power switch and generate a current signal consisting essentially of an AC component thereof;
- a feedback compensator circuit coupled to the current sense circuit and to a feedback control signal line, the feedback compensator circuit being configured to generate a signal based upon the current signal and a voltage feedback control signal that is a direct measurement of the output voltage and is to be used to control the state of the power switch; and the burst-mode switching voltage regulator further comprises
- a resistor-divider network coupled in parallel to the output capacitor, the resistor-divider network to provide the voltage feedback control signal.

9. The burst-mode switching voltage regulator of claim 8, wherein the voltage regulator circuit further comprises:
- an amplifier coupled between the current sense circuit and the feedback compensator circuit, the amplifier to increase the magnitude of the detected current; and
- a filter coupled between the amplifier and the feedback compensator circuit, the filter to eliminate any direct current (DC) offset present in the amplified detected current.

10. The burst-mode switching voltage regulator of claim 8, wherein the current sense circuit comprises a ratio switch coupled in series with a resistor that is coupled to the input power source, wherein the ratio switch and the resistor is coupled in parallel with the power switch, and wherein both the power switch and the ratio switch is controlled by the same control signal.

11. The burst-mode switching voltage regulator of claim 8, wherein the feedback compensator circuit comprises:
- a summing point coupled to the current sense circuit and receiving the current signal and the voltage feedback control signal, the summing point to combine the current signal and the voltage feedback control signal; and
- a comparator having a first input coupled to an output of the summing point and a second input coupled to a reference voltage supply, the comparator to produce an output signal based upon a comparison of the output of the summing point and a signal produced by the reference voltage supply.

12. The burst-mode switching voltage regulator of claim 8, wherein the voltage regulator circuit is integrated into an integrated circuit, and wherein an inductor and the output capacitor are discrete components.

13. The burst-mode switching voltage regulator of claim 8, wherein the burst-mode switching voltage regulator is a buck burst-mode switching voltage regulator.

14. The burst-mode switching voltage regulator of claim 8, wherein the burst-mode switching voltage regulator is a boost burst-mode switching voltage regulator.

15. A method for regulating a voltage in a burst-mode switching voltage regulator, the method comprising:
- sensing a current feedback signal based upon an output current consisting essentially of an AC component therof;
- sensing a voltage feedback signal that is a direct measurement of an output voltage;
- deriving a control signal based upon the current feedback signal and the voltage feedback signal; and
- using the control signal to control the state of a switch regulating current flow in the burst-mode switching voltage regulator.

16. The method of claim 15 further comprising after the first sensing, processing the current feedback signal.

17. The method of claim 16, wherein the processing comprises: amplifying the current feedback signal; and filtering the current feedback signal.

18. The method of claim 15, wherein the first sensing comprises sensing a current flowing through a ratio transistor that is coupled in parallel with a main transistor, wherein the ratio transistor is significantly smaller than the main transistor.

19. The method of claim 15, wherein the second sensing comprises using a resistor-divider network to produce a scaled version of the output voltage.

20. The method of claim 15, wherein the deriving comprises using a comparator to compare a combination of the current feedback signal and the voyage feedback signal with a reference voltage.

* * * * *